J. J. Lindly,
Wheel Cultivator.

No. 93,318.          Patented Aug. 3, 1869.

Witnesses:
William W. Herthel
Robert Burns

Inventor:
John J. Lindly
by his attys
Herthel &

UNITED STATES PATENT OFFICE.

JOHN J. LINDLY, OF LEBANON, ILLINOIS.

IMPROVEMENT IN GANG-PLOWS.

Specification forming part of Letters Patent No. 93,318, dated August 3, 1869.

*To all whom it may concern:*

Be it known that I, JOHN J. LINDLY, of Lebanon, in the county of St. Clair, State of Illinois, have made certain new and useful Improvements in Gang-Plows for Second Plowing and Similar Purposes; and I do hereby declare the following to be a full and true description thereof, reference being had to the accompanying drawings, and to the letters of reference marked thereon.

This invention relates more especially to that form of gang-plows which is used to plow under weeds or so called "cheat" growths in wheat or other grain-fields, said invention being, by its form and operation, adapted to apply for second plowing wherever necessary.

The nature of this invention is in the mode of attaching and supporting the plow-bars to the plow-frame, and in the manner of attaching the plow-standards to the plow-bars, and in certain other details of construction.

Figure 1:
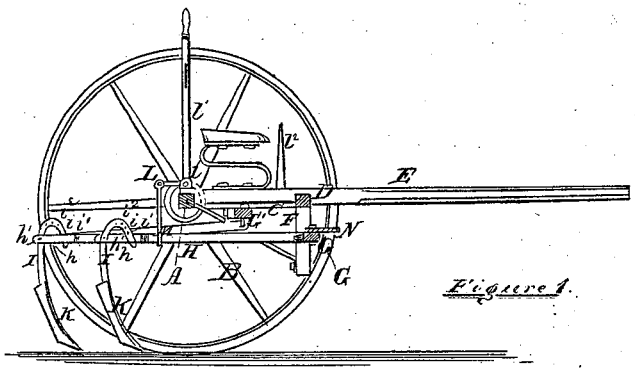
Figure 2:
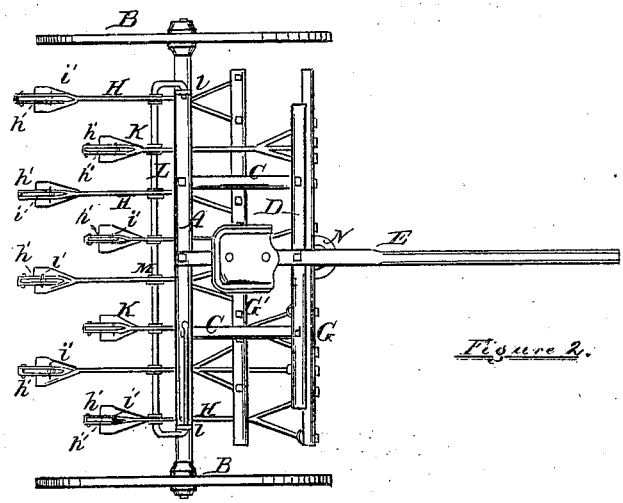
Figure 3:
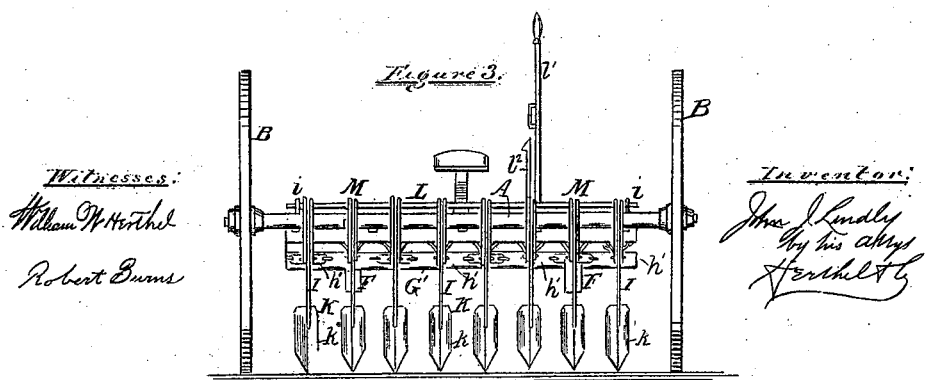

To enable those herein skilled to make and use my said improved plows, I will now fully describe the same, referring to the accompanying Figure 1 as a sectional elevation; to Fig. 2 as a plan; to Fig. 3 as a rear end view.

I support the axle A upon wheels B. Said axle connects with longitudinal frame-bars C, which are connected by the transverse bar D. The tongue or pole E is secured to both the axle A and bar D.

From the bar D, I depend the posts F, which support the draft bar or timber G. A similar timber or bar, G', is secured under the frame-bars C. To the draft-timbers G and G' the draft-bars of the plows attach.

In the arrangement shown in the drawings I have placed the plows in a zigzag line, the bar G being then, as shown, in front of G', in the relative position similar to the plows.

In order that plows thus arranged may be raised out of the ground to the required height, and in order to place the bars G and G' as near the line of draft of the plows when in ground, it is advantageous to give the rear timber or bar, G', a position higher than that of G generally, as indicated at Figs. 1 and 3. The plow-bar H connects by staples with the timbers G G', in the usual manner, and said bars have forked ends $h$, to which the plow-standards I are pivoted at $h'$. Said standards are curved forward, so that the forward ends, $i$, re-enter the forks $h$, and a wooden or similar pin, $i'$, placed in one of the holes, $i^2$, of the curved standard, holds the plows against the usual ground-draft, while by the breakage of said pin in encountering tree-stumps or other dangerous obstacles breakage of the plows or their standards is avoided. When the machine is "backing," the pin $i'$ leaves the top edge of the plow-bars, and the plows are canted forward without damage or inconvenience.

To the lower end of the standards I the plows K are attached. Said plows have center ridges, $k$, so as to shed earth both sides and reduce the draft. By such form of plow and the light draft due thereto, soil may be replowed, using a great number of plows (say eight) and covering a large extent of surface with the ordinary draft-power of a two-horse team.

To throw the plows out of ground and otherwise adjust the same, I arrange the crank-bar L, pivoted at $l$ on the axle, and turned by the hand-lever $l'$, which has a proper staple to hook upon a detaining-spring, $l^2$, when the bar L is raised to hold all the plows out of ground.

From the bar L the straps M depend, passing under the plow-bars H and acting to raise the plow-bars and plows when operated by the crank-bar L, as aforesaid.

The team for draft attaches to the stirrup N, secured to the lower bar, G, to bring the line of power nearly in coincidence with the line of plow resistance.

Having thus fully described my invention, what I claim is—

1. The arrangement of the bars G G' with the plow-bars H, and relative to the frame A C and the draft attachment N, substantially as and for the purposes set forth.

2. The crank-bar L, its lever $l'$, and straps M, arranged to raise the plow-bars H, substantially as set forth.

In testimony whereof I have hereunto set my hand.

JOHN J. LINDLY.

Witnesses:
  GEO. P. HERTHEL,
  WILLIAM W. HERTHEL.